No. 828,013. PATENTED AUG. 7, 1906.
A. E. AYER.
EDGE FINISHING MACHINE.
APPLICATION FILED APR. 29, 1905.
2 SHEETS—SHEET 1.
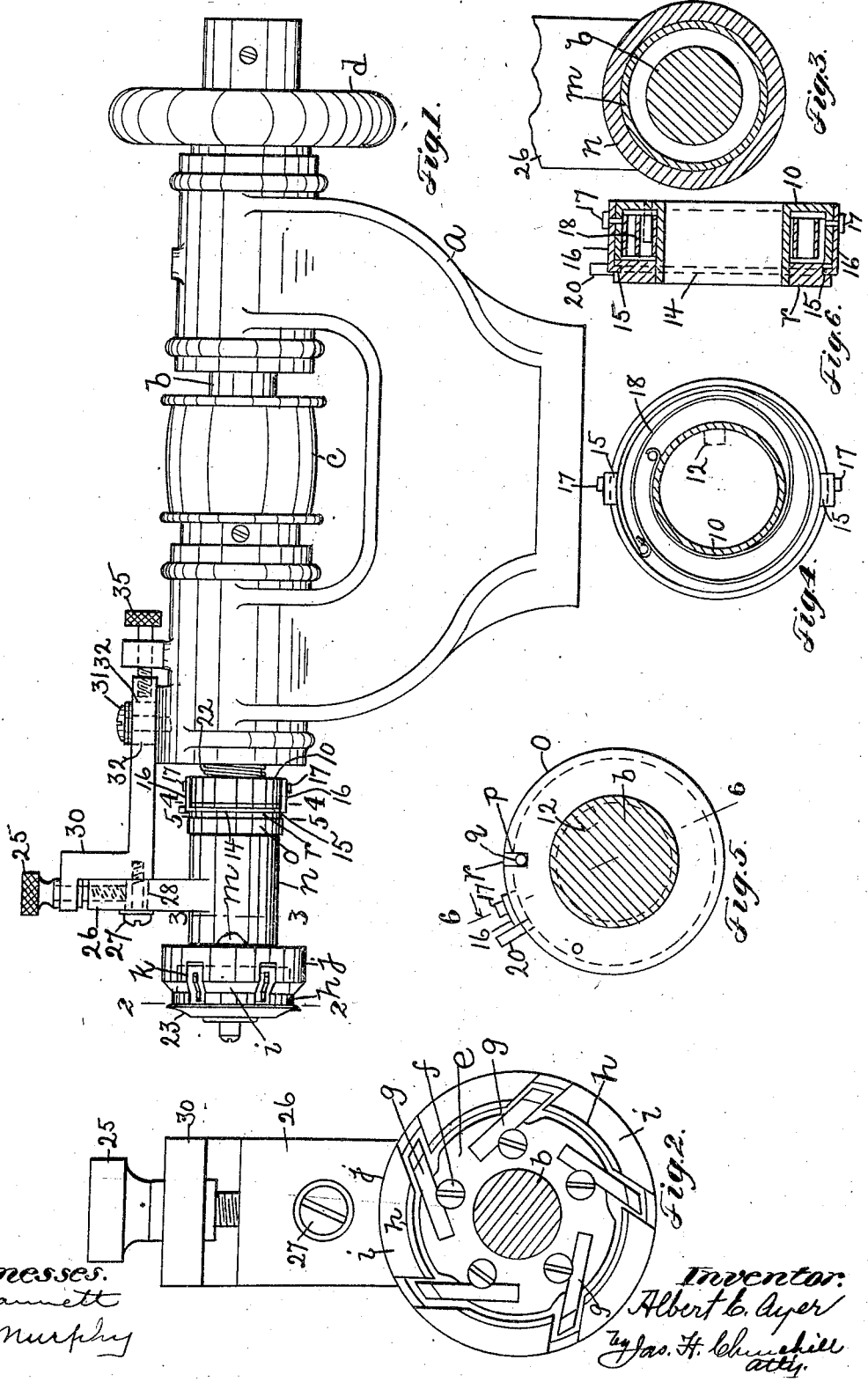
Witnesses.
C. H. Gannett
J. Murphy
Inventor:
Albert E. Ayer
by Jas. H. Churchill
atty.

No. 828,013. PATENTED AUG. 7, 1906.
A. E. AYER.
EDGE FINISHING MACHINE.
APPLICATION FILED APR. 29, 1905.
2 SHEETS—SHEET 2.
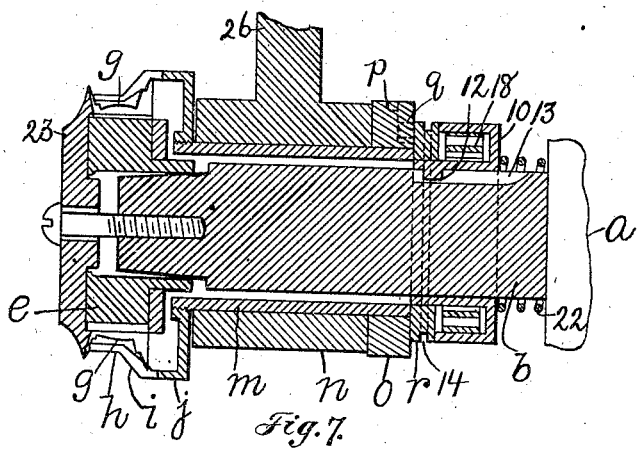
Witnesses.
C. H. Gannett
J. Murphy
Inventor.
Albert E. Ayer
by Jas. H. Churchill
atty.

UNITED STATES PATENT OFFICE.

ALBERT E. AYER, OF CHELSEA, MASSACHUSETTS, ASSIGNOR, BY DIRECT AND MESNE ASSIGNMENTS, TO RUTH L. VOSE, OF BROOKLINE, MASSACHUSETTS.

EDGE-FINISHING MACHINE.

No. 828,013.　　　Specification of Letters Patent.　　　Patented Aug. 7, 1906.

Application filed April 29, 1905. Serial No. 258,003.

*To all whom it may concern:*

Be it known that I, ALBERT E. AYER, a citizen of the United States, residing in Chelsea, in the county of Suffolk and State of Massachusetts, have invented an Improvement in Edge-Finishing Machines, of which the following description, in connection with the accompanying drawings, is a specification, like characters on the drawings representing like parts.

This invention relates to a machine for trimming the edges of the soles and heels of boots and shoes, and is herein shown as embodied in a machine for trimming the edges of the soles of boots and shoes.

The invention has for its object to provide a simple and efficient machine for this purpose and one with which a cut of uniform depth may be obtained. For this purpose I employ a cutting tool or head which is fast to a rotatable shaft and is provided with a plurality of knives or cutters with which coöperates a bed against which the work may bear and which is connected with the shaft to rotate therewith, yet which is capable of radial adjustment with relation to said shaft to adjust the said bed with relation to the cutting edges of the knives to uncover more or less of the said knives to regulate the depth of the cut made, whereby the shavings or pieces of material removed by the knives may be of uniform thickness, with the result that the edge of the sole is trimmed in a superior manner. The bed may be longitudinally adjustable on its shaft, as will be described. These and other features of this invention will be pointed out in the claims at the end of this specification.

Figure 1 is an elevation of an edge-trimming machine embodying this invention; Fig. 2, a section on the line 2 2, Fig. 1, taken on an enlarged scale; Fig. 3, a section on the line 3 3, Fig. 1; Fig. 4, a section on the line 4 4, Fig. 1, taken on an enlarged scale; Fig. 5, a section on the line 5 5, Fig. 1, taken on enlarged scale; Fig. 6, a section on the line 6 6, Fig. 5; and Fig. 7, a longitudinal sectional detail through the main shaft shown in Fig. 1.

Referring to Fig. 1, $a$ represents the head of a rotary edge-trimming machine in which is supported in suitable bearings a shaft $b$, provided with a driving-pulley $c$ and with a fly-wheel $d$. The shaft $b$ has fast on it a rotary cutter comprising a cutter-head $e$, having fast to it, as by screws $f$, a plurality of peripheral knives or cutters $g$, suitably shaped to cut or trim the edge of the sole of a boot or shoe. The knives or cutters $g$ have coöperating with them a bed consisting in the present instance of an annular rim $h$, connected by an inclined rim $i$ to a larger annular rim $j$, said rims being provided with suitable slots $k$, into which the knives or cutters project, as represented in Figs. 1 and 2.

The rim $j$ is attached to a sleeve $m$ of larger diameter than the shaft $a$ and extended through a bearing-hub $n$ and has on the opposite side of the bearing-hub $n$ a collar $o$, provided with a slot $p$, extended radially from its circumference toward the sleeve. (See Fig. 5.) The annular bed may be detachably secured to the sleeve $m$ and for this purpose may be screwed thereon. (See Fig. 7.) The slot $p$ is designed to receive a stud or pin $q$, projecting from a ring $r$, movably secured to a second ring 10, which latter is provided on its inner circumference with a stud or projection 12, adapted to enter a longitudinal slot 13 in the shaft $b$ (see Fig. 7) and constituting a key by means of which the ring 10 and the bed connected therewith are secured to the shaft $b$ to rotate therewith. Provision is made for the bed to have a limited rotary movement in its bearing, and for this purpose the ring $r$ is provided with an annular groove 14, into which project fingers 15 on bars 16, attached to the periphery of the ring 10, as by the screw 17. (See Fig. 6.) The ring 10 is provided with an annular recess to receive a spring 18, one end of which is fastened to the ring 10 and the other end of which is fastened to the ring $r$, the ring $r$ being mounted to turn on the ring 10, as clearly shown in Figs. 6 and 7. The movement of the ring $r$ on the ring 10 in one direction is limited by a stop, shown as a pin or projection 20, which coöperates with one of the arms 16. The stop 20 is located with relation to the arm 16 so that the rotation of the shaft $b$ in one direction carries with it the ring $r$ and the bed connected therewith by means of the pin $q$ and slot $p$. The shaft $b$ between the head $a$ and the ring 10 may be encircled by the helical spring 22 to permit of a yielding movement of the bed in operation so as to accommodate soles of different thicknesses. The shaft $b$ may have attached to it a disk or cap 23, constituting a rand-guard, which is designed to run in the crease formed between the sole and the upper of a boot or shoe to protect the upper from the cutting-knives.

The bearing-hub $n$ is capable of radial movement with relation to the shaft $a$, which may be effected by means of a thumb-screw 25, extended into a suitable socket in an arm 26, projecting radially from the hub $n$, and said bearing-hub may be secured in its adjusted position by means of a set-screw 27, extended through an opening 28 in the arm 26 and into a supporting arm or bracket 30, which carries the screw 25 and which is extended longitudinally of the shaft $b$. The supporting-arm 30 may also be adjustably secured to the head $a$ by a set-screw 31, extended through an opening 32 of larger diameter than the screw 31, and may be moved longitudinally by the screw 35.

From the above description it will be seen that the bed supported by the bearing-hub $n$ rotates with the shaft and with the cutter-head $c$, and the said bed is capable of being radially adjusted with relation to the shaft and the cutter-head, so as to uncover more or less of the cutting edges of the knives, with the result that the bed against which the edge of the sole of the shoe is held is effectively trimmed by reason of the fact that the shavings or trimmings taken off from the edge of the sole are of uniform thickness. The adjustment of the bed with relation to the cutter-head and its knives may be effected by the operator in the present instance while the machine is in operation. The bed may be detachable from the sleeve $m$, so that beds of different widths or sizes may be secured to the sleeve $m$ to suit work of different thicknesses, and the longitudinal adjustment of the bearing-hub $n$ permits beds of different widths to be used.

By making the bed which rotates with the shaft radially adjustable with relation thereto I am enabled to obtain a quick and easy adjustment of the cutting edges of the knife with relation to the work without adjustment of the knives, thereby effecting a material saving in time in adjusting a machine to work in the proper or desired manner. The movable bed against which the edge of the sole bears regulates the distance the cutting edge of the knife projects beyond the said bed, so as to obtain a uniform shaving at all times and of any desired thickness within limits. By making the bed movable longitudinally on its shaft and providing the spring 22 for yieldingly holding the inclined rim or surface $i$ in proper position with relation to the knives the function of a feather-edger is imparted to the machine. The spring 18 is employed to prevent the pin $q$ from binding in the slot $p$ during each rotation of the shaft when the bed has been moved eccentrically to the shaft to uncover more or less of the knives.

I claim—

1. In a machine of the class described, in combination, a rotatable shaft, a cutter-head fast thereon, a plurality of cutters extended from the periphery of said head, a bed provided with slots into which said cutters extend, means to connect said bed with said shaft to cause said bed to revolve with said shaft, means to support said bed out of contact with said shaft, and means to effect movement of said support radially with relation to said shaft while the latter is in rotation, substantially as described.

2. In a machine of the class described, in combination, a rotatable shaft, a cutter-head fast thereon, a cutter extended from the periphery of the said head, a bed coöperating with the said cutter and connected with the said shaft to rotate therewith, and means for effecting radial movement of the bed with relation to the shaft and its attached cutter-head, substantially as described.

3. In a machine of the class described, in combination, a rotatable shaft, a cutter carried by said shaft and projecting therefrom at an angle thereto, a bed coöperating with and projected into the path of movement of said cutter to support the work while being acted upon by said cutter and connected with said shaft to rotate therewith, and means for effecting radial movement of said bed with relation to said knife and shaft, substantially as described.

4. In a machine of the class described, in combination, a rotatable shaft, a tool carried by said shaft, a sleeve of greater diameter than said shaft mounted thereon and coöperating with said tool, a support into which said sleeve is extended, and means for connecting said sleeve with said shaft to cause the sleeve to rotate with said shaft and to permit of radial movement thereof while so connected.

5. In a machine of the class described, in combination, a rotatable shaft, a tool carried by said shaft, a sleeve of greater diameter than said shaft mounted thereon and coöperating with said tool, a support into which said sleeve is extended, and means for connecting said shaft to cause the sleeve to rotate with said shaft and to permit of radial movement thereof while so connected, said means having provision for permitting a limited rotary movement in one direction on said shaft, substantially as described.

6. In a machine of the class described, in combination, a rotatable shaft, a cutter-head attached thereto to revolve therewith, a plulity of cutters carried by said head, an annular bed coöperating with said cutters, and means to secure said bed to said shaft to revolve therewith and to permit of radial movement with relation thereto.

7. In a machine of the class described, in combination, a rotatable shaft, a cutter-head attached thereto to revolve therewith, a plurality of cutters carried by said head, and a bed coöperating with said cutters and connected with a shaft to revolve therewith and radially adjustable with relation thereto, substantially as described.

8. In a machine of the class described, in combination, a rotatable shaft, a cutter or knife carried thereby, and a bed for the work to rest against connected to said shaft to revolve therewith and radially adjustable with relation thereto, substantially as described.

In testimony whereof I have signed my name to this specification in the presence of two subscribing witnesses.

ALBERT E. AYER.

Witnesses:
JAS. H. CHURCHILL,
J. MURPHY.